(12) United States Patent
Uehira et al.

(10) Patent No.: US 9,479,010 B2
(45) Date of Patent: Oct. 25, 2016

(54) POWER CONTROL DEVICE

(71) Applicant: Tsubakimoto Chain Co., Osaka-shi, Osaka (JP)

(72) Inventors: Makoto Uehira, Osaka (JP); Shingo Koyama, Osaka (JP)

(73) Assignee: Tsubakimoto Chain Co., Osaka-shi, Osaka (JP)

( * ) Notice: Subject to any disclaimer, the term of this patent is extended or adjusted under 35 U.S.C. 154(b) by 187 days.

(21) Appl. No.: 14/397,382

(22) PCT Filed: May 27, 2013

(86) PCT No.: PCT/JP2013/064582
§ 371 (c)(1),
(2) Date: Oct. 27, 2014

(87) PCT Pub. No.: WO2013/190951
PCT Pub. Date: Dec. 27, 2013

(65) Prior Publication Data
US 2015/0092464 A1    Apr. 2, 2015

(30) Foreign Application Priority Data

Jun. 18, 2012 (JP) ................. 2012-137136

(51) Int. Cl.
*H02J 9/06* (2006.01)
*H02J 3/06* (2006.01)
(Continued)

(52) U.S. Cl.
CPC ............. *H02J 9/06* (2013.01); *H01H 47/002* (2013.01); *H02H 3/04* (2013.01); *H02H 3/207* (2013.01);
(Continued)

(58) Field of Classification Search
CPC ........ H02J 2003/388; H02J 3/06; H02J 9/06; H01H 2300/018; H01H 47/002; H02M 1/10; H02M 7/53871; H02H 3/04; H02H 3/207
See application file for complete search history.

(56) References Cited

U.S. PATENT DOCUMENTS 4,734,634 A * 3/1988 Kito ...................... H02P 29/025
                                                            139/1 E
5,315,533 A * 5/1994 Stich ....................... H02J 9/062
                                                            307/66
(Continued)

FOREIGN PATENT DOCUMENTS

JP     08-196040    7/1996
JP     10-051959    2/1998
(Continued)

*Primary Examiner* — Crystal J Barnes-Bullock
(74) *Attorney, Agent, or Firm* — Bret E. Field; Bozicevic, Field & Francis LLP

(57) ABSTRACT

A power control device is provided which can execute self-sustaining operation only when conditions for allowing the self-sustaining operation are satisfied reliably, so as to supply AC power to a power load connected with a power system before the self-sustaining operation.

In a case where an instruction to change the power control device into the self-sustaining operation state is accepted, the inverter is connected with the loads by the disconnection relay and the self-sustaining operation is started when voltage to be applied to a wiring portion between the disconnection relay and the earth leakage breaker is not detected, when current flowing between the main breaker and the power system is not detected and when a contact signal indicative of the open/close state of the main breaker indicates an open state. Moreover, the inverter is disconnected from the power system by the disconnection relay and the self-sustaining operation is stopped when the power control device is in the self-sustaining operation state in addition to that current flowing to or from the power system is detected or to that a contact signal indicative of the open/close state of the main breaker indicates a close state.

7 Claims, 5 Drawing Sheets

(51) Int. Cl.
*H01H 47/00* (2006.01)
*H02M 1/10* (2006.01)
*H02M 7/5387* (2007.01)
*H02H 3/04* (2006.01)
*H02H 3/20* (2006.01)
*H02J 3/38* (2006.01)
*H02M 7/44* (2006.01)

(52) U.S. Cl.
CPC .................. *H02J 3/06* (2013.01); *H02J 3/381* (2013.01); *H02M 1/10* (2013.01); *H02M 7/44* (2013.01); *H02M 7/53871* (2013.01); *H01H 2300/018* (2013.01); *H02J 2003/388* (2013.01)

(56) References Cited

U.S. PATENT DOCUMENTS

| | | | | |
|---|---|---|---|---|
| 5,625,539 | A * | 4/1997 | Nakata | H02M 7/4807 363/132 |
| 5,627,737 | A * | 5/1997 | Maekawa | H02J 3/06 307/73 |
| 5,737,168 | A * | 4/1998 | Baker | H02H 3/207 361/84 |
| 6,172,889 | B1 * | 1/2001 | Eguchi | H02J 3/38 363/55 |
| 7,177,168 | B2 * | 2/2007 | Toyomura | H01R 13/7039 363/131 |
| 7,514,815 | B2 * | 4/2009 | Paik | H02J 3/14 307/64 |
| 7,786,617 | B2 * | 8/2010 | Paik | H02J 3/14 307/64 |
| 8,446,040 | B2 * | 5/2013 | Paik | H02J 3/14 307/39 |
| 8,476,862 | B2 * | 7/2013 | Matsumoto | B60L 3/0046 180/65.1 |
| 2006/0202556 | A1 * | 9/2006 | Tanaka | H01H 9/548 307/11 |
| 2006/0202559 | A1 | 9/2006 | Hashimoto et al. | |
| 2011/0170219 | A1 | 7/2011 | Yamane et al. | |

FOREIGN PATENT DOCUMENTS

| | | |
|---|---|---|
| JP | 2006-254537 | 9/2006 |
| WO | WO2011016092 A1 | 2/2011 |

* cited by examiner

POWER CONTROL DEVICE

This application is the national phase under 35 U.S.C. §371 of PCT International Application No. PCT/JP2013/064582 which has an International filing date of May 27, 2013 and designated the United States of America, which claims priority to Japanese Application No. JP2012-137136, filed on 18 Jun. 2012.

FIELD

The present invention relates to a power control device including: an inverter that converts DC (Direct-Current) power supplied from outside into AC (Alternating-Current) power; a control unit that performs control so that AC power converted by the inverter is supplied to a power load, which is to be supplied with AC power from a power system, in linkage with the power system; and a disconnection relay for disconnecting the inverter from the power system.

BACKGROUND

In recent years, an electric vehicle has begun to spread instead of an automobile provided with an internal-combustion engine which causes a high environmental load due to exhaust gas. In anticipation of further spread of an electric vehicle, some inventors have tried to achieve effective utilization of electric power stored in an electric vehicle in each household. Here, DC power supplied from an electric vehicle is converted by a power conversion device into AC power linked with a power system, and then is supplied to a power load in household. Thus, so-called V to H (Vehicle to Home) is realized.

Similarly, a power control device (which is also called as a power conditioner) is also used for supplying electric power, which is generated by a power generation device such as a solar panel or cogeneration, to a power load connected with a power system. In this manner, a power control device plays an important role for linkage with a power system. However continuation of isolated operation in a state connected with a power system is inhibited when power failure occurs in the power system, in order to ensure safety. On the other hand, when assuming power failure due to a disaster or the like, it is preferable to break connection with a power system by a breaker and then supply electric power to a power load, so as to back up the supply of electric power.

For example, Japanese Patent Application Laid-Open No. 08-196040 discloses a dispersion type power source system which can cause a power conversion device (power control device) to perform self-sustaining operation when abnormality occurs in a power system and can return the operation of the power conversion device to linkage operation linked with the power system when the power system is returned to the normal state. Moreover, Japanese Patent Application Laid-Open No. 2006-254537 discloses technique wherein a power generation device linked with a power system can start and stop self-sustaining operation during power failure of the power system.

SUMMARY

The technique disclosed in Japanese Patent Application Laid-Open No. 08-196040, however, has a complicated configuration, since only a part of a plurality of power loads connected with a bus in a panel board is to be backed up in self-sustaining operation and the power conversion device includes: a relay for making disconnection between a part of power loads and other power loads; and a part of a bus to be disconnected by the relay. The technique further has a problem that it may be impossible to disconnect the power conversion device reliably from the power system during the self-sustaining operation depending on the content of abnormality in the system, since the operation of the power conversion device is switched to the linkage operation or the self-sustaining operation on the basis of the range of detected frequency and voltage of the power system. This may possibly cause a dangerous state where voltage of an inverter is applied to the power system during power failure or cause occurrence of abnormality in voltage of the power system by reverse power flow of electric power which is not linked with the power system, so as to impair safety of the self-sustaining operation.

Moreover, the technique disclosed in Japanese Patent Application Laid-Open No. 2006-254537 has a problem that, when power failure of the power system is detected and self-sustaining operation of a power supply is started, electric power generated by a power generation device is supplied from a self-sustaining output terminal to outside but is not supplied to an electric load (power load) connected with a bus in a switchboard (panel board).

The present invention has been made in view of such a situation, and the object thereof is to provide a power control device, which can execute self-sustaining operation only when conditions for allowing the self-sustaining operation are satisfied reliably, so as to supply AC power to a power load connected with a power system before the self-sustaining operation.

A power control device according to the present invention includes: an inverter that converts DC power into AC power; a control unit that performs control so that AC power converted by the inverter is supplied, in linkage with a power system, to a power load which is to be supplied with electric power from the power system via a breaker and a current detector; and a disconnection relay for disconnecting the inverter from the power system. The power control device further includes: take-in means for taking in a contact signal indicative of the open/close state of the breaker; and a voltage detector that detects voltage at the power system side of a circuit to be disconnected by the disconnection relay. The control unit includes: storage means in which whether the power control device is in a predetermined operating state or not is stored; first determination means for determining whether the voltage detector has detected voltage or not; second determination means for determining whether the current detector has detected current or not; and acceptance means for accepting an instruction to put the power control device into the predetermined operating state when an information that the power control device is not in the predetermined operating state is stored in the storage means. The control unit causes the disconnection relay to connect the inverter with the power load and stores, in the storage means, an information that the power control device is in the predetermined operating state, in a case where the acceptance means accepts the instruction, where the first determination means and the second determination means determine that voltage and current have not been detected and where a contact signal taken in by the take-in means indicates an open state.

In the present invention, when an instruction to put the power control device, which is not in a predetermined operating state, into the predetermined operating state is accepted, the inverter is connected with the power load by the disconnection relay and the power control device is put into a predetermined operating state in a case where voltage is not detected at the power system side of a circuit to be disconnected by the disconnection relay for disconnecting the inverter from the power system, where current flowing from or to the power system is not detected and where a contact signal indicative of the open/close state of a breaker that disconnects the power load from the power system indicates an open state.

Thus, when an instruction to put the power control device into a self-sustaining operation state is accepted in the situation where the power control device is in an operating state other than the self-sustaining operation, for example, voltage is not detected at the power system side of a contact of the disconnection relay, and therefore it is detected that voltage is not applied to a circuit at the power control device side of the breaker either from the inverter or from the power system. Moreover, current to or from the power system is not detected, and therefore it is detected that there is no inflow of current from the power system and no outflow of current to the power system. Furthermore, since the breaker is open, it is detected that the power control device is in a state separated from the power system. After detecting the above three matters, the inverter is connected with the power load and the self-sustaining operation is started. That is, safety of the self-sustaining operation is further ensured, since opening of a breaker by the user is detected as an essential condition and it is also detected that there is no input-output of voltage and current regarding the power system before a start of the self-sustaining operation.

It is to be noted that, in a case where the power control device is, for example, in another operating state such as linkage operation when an instruction to put the power control device into the self-sustaining operation state is accepted, the disconnection relay is never turned on until the another operating state terminates and the above three matters are detected.

In the power control device according to the present invention, the control unit includes means for accepting a predetermined signal in the case where the acceptance means accepts the instruction, where the first determination means and the second determination means determine that voltage and current have not been detected and where a contact signal taken in by the take-in means indicates an open state. The control unit connects the inverter with the power load when the means accepts the predetermined signal.

In the present invention, in a case where an instruction to put the power control device into the self-sustaining operation state is accepted and the above-mentioned three matters are detected, the inverter is connected with the power load when a predetermined signal is further accepted.

Thus, actual self-sustaining operation starts when predetermined time comes or when the user gives an instruction to start the self-sustaining operation, for example, after the above-mentioned three matters are detected.

In the power control device according to the present invention, the control unit causes the disconnection relay to disconnect the inverter from the power system and stores, in the storage means, an information that the power control device is not in the predetermined operating state, when an information that the power control device is in the predetermined operating state is stored in the storage means in addition to that the second determination means determines that current has been detected or to that a contact signal taken in by the take-in means indicates a close state.

In the present invention, the inverter is disconnected from the power system by the disconnection relay and it is judged that the power control device is not in a predetermined operating state when the power control device is in a predetermined operating state in addition to that current flowing from or to the power system is detected or to that a contact signal indicative of the open/close state of a breaker indicates a close state.

Thus, in a case where the power control device is in the self-sustaining operation state, for example, the self-sustaining operation is stopped when current to or from the power system is detected and therefore it is detected that there is inflow of current from the power system or outflow of current to the power system, or when the breaker is closed and therefore it is detected that the power control device is not in a state separated from the power system. That is, when closing of the breaker by the user is detected or when input-output of current to or from the power system is detected, the inverter is disconnected reliably from the power system and the self-sustaining operation is stopped, and therefore safety of the self-sustaining operation is ensured doubly.

In the power control device according to the present invention, the breaker is connected in series with another breaker.

In the present invention, a breaker that disconnects a power load from the power system is connected in series with another breaker, and therefore opening of a breaker performed by the user before a start of the self-sustaining operation is expected to be achieved more reliably.

In the power control device according to the present invention, a relay switch is interposed between the breaker and the power load. The relay switch is turned on by control voltage applied from the power system via the breaker and a contact, which is turned on when the breaker is in a close state.

In the present invention, control voltage for turning on a relay switch interposed between the power load and the breaker that disconnects the power load from the power system is applied from the power system via a contact of the breaker itself and a contact, which is turned on when the breaker is in a close state.

Thus, in a case where power failure occurs in the power system after the breaker is closed, the relay switch is turned off necessarily because of the structure thereof and the relay switch is never turned on after the breaker is opened even when the power system is restored from power failure. Therefore the inverter is put into a state disconnected from the power system and safety of the self-sustaining operation is ensured. Furthermore, in a case where the breaker is closed after the self-sustaining operation is started in a state where the breaker is open, misconnection of the inverter with the power system is prevented when closing of the breaker is detected and the inverter is stopped during delay time before turn-on of the relay switch.

In the power control device according to the present invention, the power system is connected with a voltage detector having a second relay switch. The control unit includes display means for making a predetermined display when the voltage detector detects a predetermined voltage.

In the present invention, the display means makes a predetermined display in a case where power restoration of the power system is detected by a relay switch which operates when voltage of the power system becomes higher than a predetermined voltage.

Thus, a message that power has been restored is displayed when the power system is restored from power failure during the self-sustaining operation, for example.

In the power control device according to the present invention, the breaker is provided in a panel board having a cover. The control unit includes detection means for detecting that the cover has been opened. The control unit causes the disconnection relay to disconnect the inverter from the power system and stores, in the storage means, an information that the power control device is not in the predetermined operating state, in a case where an information that the power control device is in the predetermined operating state is stored in the storage means and where the detection means detects that the cover has been opened.

In the present invention, in a case where the power control device is in the predetermined operating state and where it is detected that the cover of the panel board has been opened, the inverter is disconnected from the power system by the disconnection relay and it is judged that the power control device is not in the predetermined operating state.

Thus, in a case where the power control device is in the self-sustaining operation state, for example, the self-sustaining operation is stopped when it is detected that the cover of the breaker is opened artificially, and therefore safety of the self-sustaining operation is ensured.

With the present invention, in a case where an instruction to put the power control device which is not in a predetermined operating state into the predetermined operating state is accepted, the inverter is connected with the power load and the self-sustaining operation is started when voltage at the power system side of the contact of the disconnection relay is not detected so as to detect that voltage is not applied to the circuit at the power control device side of the breaker either from the power system or from the inverter, when current from or to the power system is not detected so as to detect that there is no inflow of current from the power system and no outflow of current to the power system and when the breaker is open so as to detect that the power control device is in a state separated from the power system.

Accordingly, the self-sustaining operation can be executed only when conditions for allowing the self-sustaining operation are satisfied reliably, so as to supply AC power to the power load connected with the power system before the self-sustaining operation.

The above and further objects and features will move fully be apparent from the following detailed description with accompanying drawings.

DETAILED DESCRIPTION OF NON-LIMITING EXAMPLE EMBODIMENTS

The following description will explain the present invention in detail with reference to the drawings illustrating some embodiments thereof.

(Embodiment 1)

Figure 1:
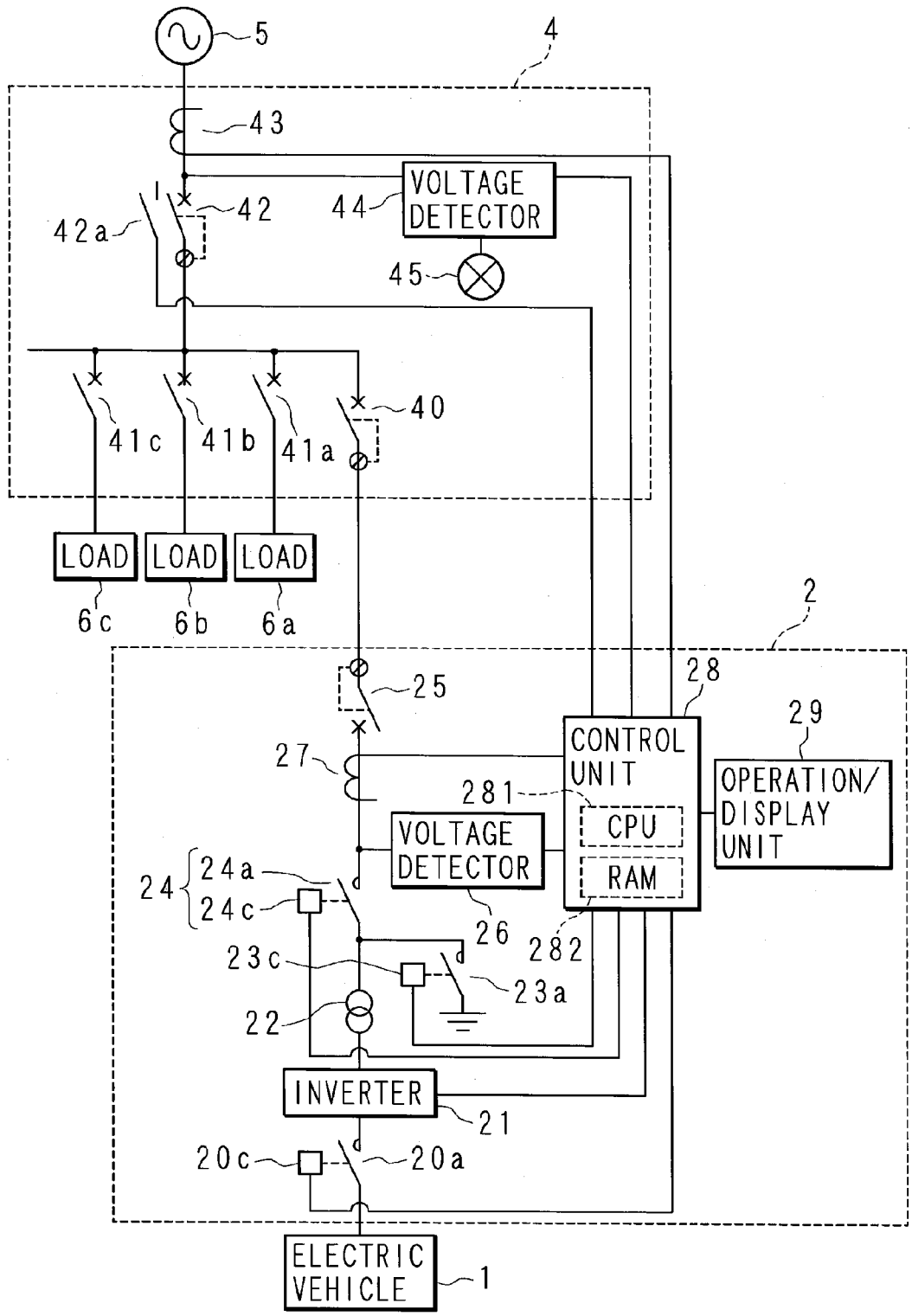
FIG. 1 is a block diagram for illustrating a connection example of a power control device according to Embodiment 1 of the present invention.

FIG. 1 is a block diagram for illustrating a connection example of a power control device according to Embodiment 1 of the present invention. FIG. 1 is drawn as a so-called single-line diagram. Denoted at 2 in the figure is a power control device. The power control device 2 includes: an inverter 21 that converts DC power supplied from an unillustrated battery of an electric vehicle (EV) 1 via a relay contact 20a into AC power: and a transformer 22 that transforms single-phase two-wire AC voltage outputted from the inverter 21 into single-phase three-wire AC voltage. The inverter 21 may be a bidirectional inverter which can convert AC power supplied via the transformer 22 into DC power and supply the DC power to the electric vehicle 1. A neutral point at the secondary side of the transformer 22 is suitably connected with the ground potential via a relay contact 23a.

AC voltage transformed by the transformer 22 is supplied, via a relay contact 24a of a disconnection relay 24 and an earth leakage breaker 25, to an earth leakage breaker 40 provided in a panel board 4. The earth leakage breakers 25 and 40 are closed except abnormal cases such as a case where earth leakage is detected or a case where overload is detected. The earth leakage breaker 40 has a neutral conductor open-phase protection function, and detects open-phase of a neutral conductor during self-sustaining operation and protects loads 6a, 6b and 6c from overvoltage. The earth leakage breaker 40 may be omitted. Voltage applied to a wiring portion between the relay contact 24a and the earth leakage breaker 25, and current flowing through the wiring portion are detected respectively by a voltage detector 26, in which a relay switch is used, and a current transformer (CT) 27. The detection results are given to a control unit 28. The control unit 28 is connected with an operation/display unit 29 for accepting instructions and various operations by the user with a pushbutton and/or a touch panel thereof. Various information including the operating state which will be described later is displayed on an unillustrated LCD of the operation/display unit 29.

The control unit 28 is also connected with: a detection terminal of a current transformer (current detector referred in the claims) 43 that detects current flowing between a power system 5 and a main breaker (breaker referred in the claims) 42 provided in the panel board 4; a detection terminal of a voltage detector 44 that detects voltage of the power system 5; both ends of a contact 42a for outputting a contact signal indicative of the open/close state of the main breaker 42; and both ends of each of control coils 20c, 23c and 24c for respectively driving the relay contacts 20a, 23a and 24a. The voltage detector 44 is connected with a power restoration display lamp 45 which is lit when the power system 5 is restored from power failure.

The control unit 28 includes a CPU 281. The CPU 281 is connected, via a bus, with: an unillustrated ROM for storing information such as a program; a RAM 282 for temporally storing generated information; and an unillustrated I/O port for performing various inputs and outputs. The CPU 281 executes, according to a control program prestored in the above-mentioned ROM, various processes for causing the power control device 2 to perform functions thereof. In execution of these processes, the CPU 281 takes in the detection results from the voltage detectors 26 and 44 and the current transformers 27 and 43, also takes in a contact signal from the contact 42a, and excites each of the control coils 20c, 23c and 24c with the I/O port so as to turn on the relay contacts 20a, 23a and 24a. The CPU 281 also controls the operation (output voltage and/or output current, and conversion direction) of the inverter 21, and accepts a signal corresponding to an instruction and various operations given from the operation/display unit 29.

In the above-mentioned configuration, AC voltage supplied from the power system 5 via the main breaker 42, and/or AC voltage supplied from the power control device 2 via the earth leakage breaker 40 is designed to be supplied to the loads (power load referred in the claims) 6a, 6b and 6c respectively via branch breakers 41a, 41b and 41c. When only commercial power is supplied to the loads 6a, 6b and 6c, for example, the user closes the main breaker 42 and the branch breakers 41a, 41b and 41c, and the control unit 28 turns off the disconnection relay 24 (relay contact 24a thereof: the same hereinafter).

The control unit 28 stores a state number indicative of the operating state of the power control device 2 or a flag indicative of the state in the RAM 282 (a storage unit referred in the claims). Operating states defined in Embodiment 1 include: a linkage operation state wherein the power control device 2 operates in linkage with the power system 5; and a self-sustaining operation state wherein the power control device 2 operates while being disconnected from the power system 5 by the main breaker 42. When the inverter 21 is a bidirectional inverter and can convert AC power supplied from the power system 5 into DC power, a charging operation state wherein the electric vehicle 1 is charged by the converted DC power may be defined. An instruction to change the power control device 2 into each operating state is given by the user through the operation/display unit 29.

When an instruction to put the power control device 2 into the linkage operation state is given and the CPU 281 accepts the instruction, for example, the CPU 281 turns on the relay contact 20a so as to connect the electric vehicle 1 with an input of the inverter 21, and further turns on the disconnection relay 24 so as to connect an output of the inverter 21 with the loads 6a, 6b and 6c. Next, the CPU 281 activates the inverter 21 and performs control so that AC power linked with the power system 5 is outputted from the inverter 21. In such a case, the CPU 281 makes setting of the inverter 21 for performing current control realizing that output current of the inverter 21 to be detected by the current transformer 27 has the appropriate magnitude. When power failure of the power system 5 is detected by an unillustrated power failure detector during linkage operation, the disconnection relay 24 is turned off in order to avoid so-called isolated operation. The other specific linkage operation method is known, and therefore detailed description thereof will be omitted.

The self-sustaining operation will be described hereinafter using flowcharts.

Figure 2:
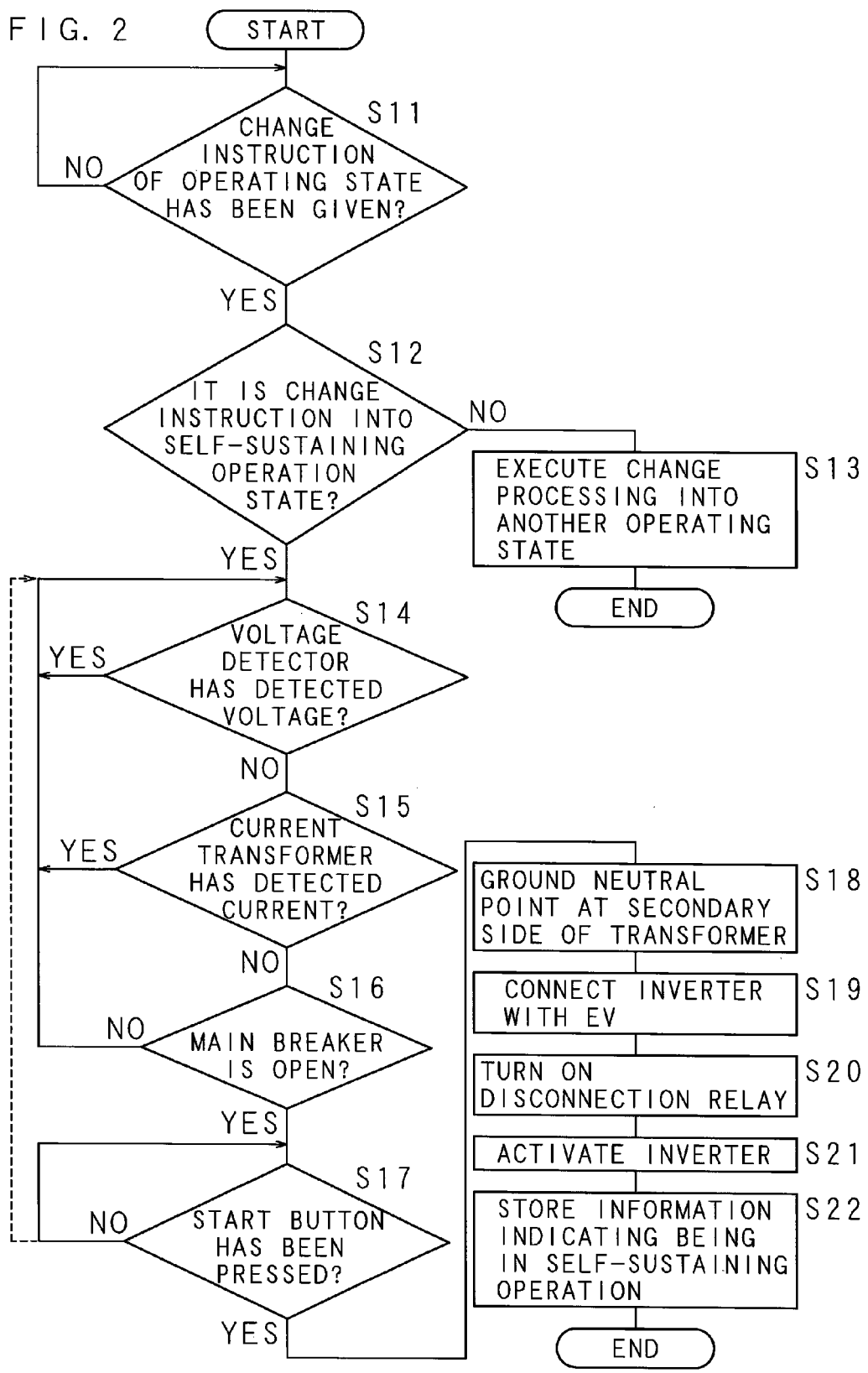
FIG. 2 is a flowchart for illustrating process procedures of a CPU for starting self-sustaining operation.
Figure 3:
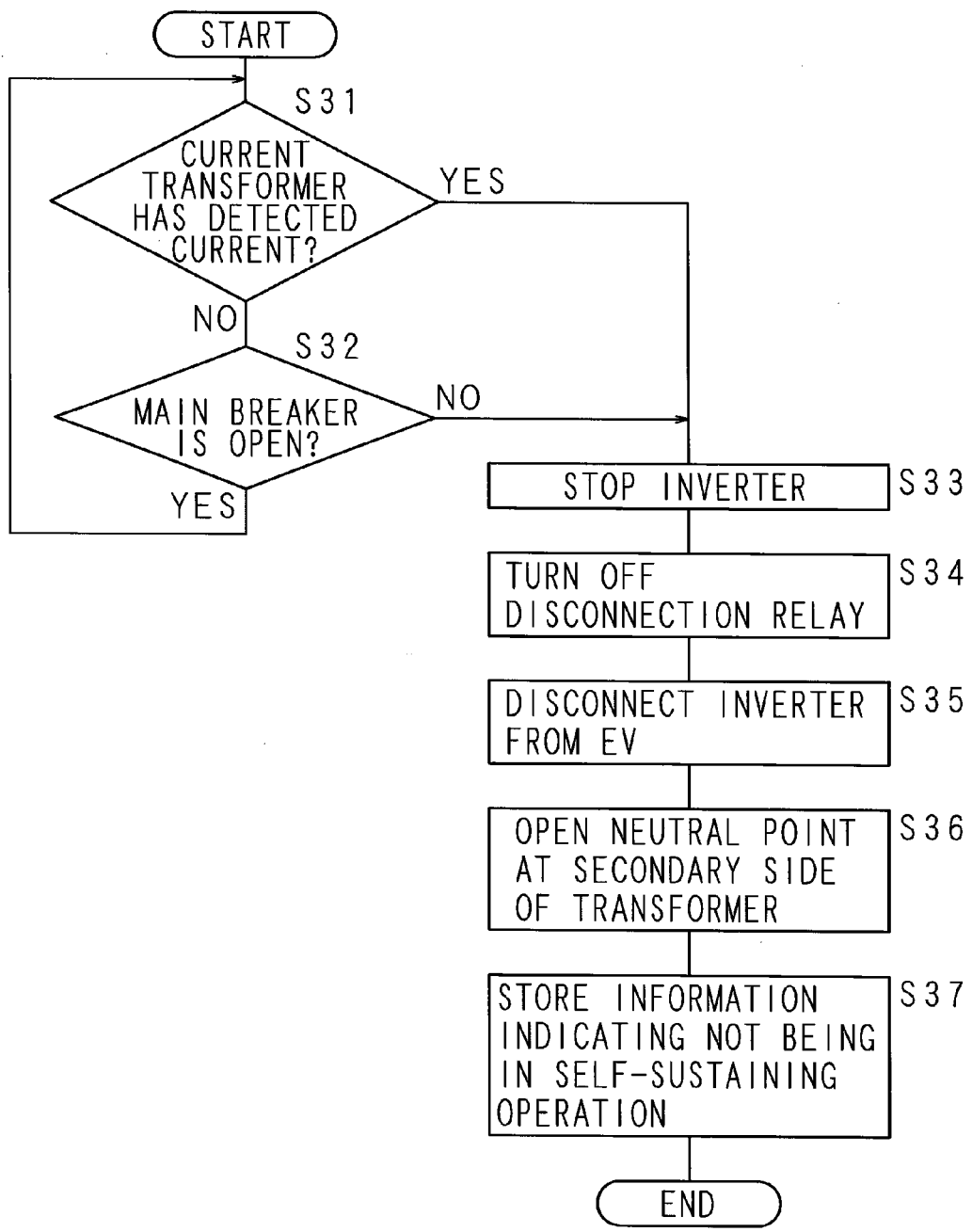
FIG. 3 is a flowchart for illustrating process procedures of a CPU for stopping self-sustaining operation.

FIG. 2 is a flowchart for illustrating process procedures of the CPU 281 for starting the self-sustaining operation. FIG. 3 is a flowchart for illustrating process procedures of the CPU 281 for stopping the self-sustaining operation. The processing of FIG. 2 is activated when it becomes possible to accept a change instruction of the operating state to be given from the operation/display unit 29 in a case where the state number or the flag indicative of the state, stored in the RAM 282, indicates that the power control device 2 is not in the self-sustaining operation state. The processing of FIG. 3 is activated when the state number or the flag indicative of the state, stored in the RAM 282, indicates that the power control device 2 is in the self-sustaining operation state, that is, when the power control device 2 is put into the self-sustaining operation state. The processing described hereinafter is executed by the CPU 281 according to a control program prestored in the above-mentioned ROM.

When the processing of FIG. 2 is activated, the CPU 281 determines whether a change instruction of the operating state has been given from the operation/display unit 29 or not (S11), and waits until the change instruction is given (S11: NO). When the change instruction is given (S11: YES), the CPU 281 determines whether the given change instruction is a change instruction into the self-sustaining operation state or not (S12). When the given change instruction is not a change instruction into the self-sustaining operation state (S12: NO), the CPU 281 executes change processing into another operating state (e.g., the linkage operation state or the charging operation state) (S13), and terminates the processing of FIG. 2.

When the change instruction given from the operation/display unit 29 is a change instruction into the self-sustaining operation (S12: YES), that is, when the change instruction into the self-sustaining operation is accepted (an acceptance unit referred in the claims), the CPU 281 determines whether the voltage detector 26 has detected voltage or not (S14: a first determination unit referred in the claims). When the voltage detector 26 has detected voltage (S14: YES), the CPU 281 returns to the step S14. Thus, the CPU 281 waits until no voltage is applied to the wiring portion between the relay contact 24a and the earth leakage breaker 25 either from the power system 5 or from the inverter 21.

When the voltage detector 26 has not detected voltage (S14: NO), the CPU 281 determines whether the current transformer 43 has detected current or not (S15: a second determination unit referred in the claims). When the current transformer 43 has been detected (S15: YES), the CPU 281 returns to the step S14. Thus, the CPU 281 waits until the main breaker 42 is opened by the user so that no current flows between the main breaker 42 and the power system 5.

When the current transformer 43 has not detected current (S15: NO), the CPU 281 takes in a contact signal given from the contact 42a (a take-in unit referred in the claims) and determines whether the main breaker 42 is open or not on the basis of the open/close state of the main breaker 42 indicated by the contact signal (S16). When the main breaker 42 is not open (S16: NO), the CPU 281 returns to the step S14. Thus, the CPU 281 waits until the main breaker 42 is opened.

When the main breaker 42 is open (S16: YES), the CPU 281 determines whether an unillustrated start button has been pressed or not on the basis of a signal given from the operation/display unit 29 (S17). When the start button has not been pressed (S17: NO), the CPU 281 repeats the processing of the step S17. Thus, the CPU 281 waits until the user makes clear declaration of intention to start the self-sustaining operation. Even while the CPU 281 is waiting, the processing may be returned to the step S14 as illustrated with the broken line in order to continue determination in the steps S14, S15 and S16.

When the start button is pressed (S17: YES), that is, when a signal corresponding to the start button is accepted (a signal acceptance unit referred in the claims), the CPU 281 executes processing for actually starting the self-sustaining operation. Specifically, the CPU 281 first grounds the neutral point at the secondary side of the transformer 22 (S18). Thus, voltage balance at the secondary side by three-wire type is maintained.

It is to be noted that, instead of waiting a press of the start button, the self-sustaining operation may be started when another condition, such as a lapse of predetermined time, arrival of predetermined time or acquisition of a predetermined signal, is satisfied.

Next, the CPU 281 turns on the relay contact 20a so as to connect the inverter 21 with the electric vehicle (EV) 1

(S19), and turns on the disconnection relay 24 (S20) so as to connect the output of the inverter 21 with the loads 6a, 6b and 6c. The CPU 281 further activates the inverter 21 (S21) to perform control so that AC power is supplied from the inverter 21 to the loads 6a, 6b and 6c.

In such a case, the CPU 281 makes setting of the inverter 21 for performing current control realizing that output voltage of the inverter 21 to be detected by the voltage detector 26 becomes constant AC voltage. The CPU 281 then stores, in the RAM 282, the state number or the flag indicating that the power control device 2 is in the self-sustaining operation (S22), and terminates the processing of FIG. 2. A message that the self-sustaining operation has been started may be displayed at the operation/display unit 29 before terminating the processing of FIG. 2.

It is to be noted that the order of execution of the processing of the steps S18 to S21 is not limited to the order illustrated in FIG. 2, and may be suitably changed so that, for example, voltage at each part is raised smoothly and therefore occurrence of rush current can be prevented.

Next, the processing of FIG. 3 will be described.

When the processing of FIG. 3 is activated, the CPU 281 determines whether the current transformer 43 has detected current or not (S31). When the current transformer 43 has detected current (S31: YES), the CPU 281 proceeds to a step S33, which will be described later, in order to stop the self-sustaining operation. When the current transformer 43 has not detected current (S31: NO), the CPU 281 determines whether the main breaker 42 is open or not on the basis of the open/close state of the main breaker 42 indicated by a contact signal given from the contact 42a (S32). When the main breaker 42 is open (S32: YES), the CPU 281 returns to the step S31. Thus, the self-sustaining operation is continued in the case where the main breaker 42 is open and where the current transformer 43 has not detected current. When voltage of the power system 5 becomes equal to or higher than a predetermined voltage during the self-sustaining operation so that the voltage detector 44 detects power restoration of the power system 5, the CPU 281 displays, at the operation/display unit 29 (a display unit referred in the claims: unillustrated in the flowchart), a message that power has been restored.

When the main breaker 42 is not open (S32: NO), the CPU 281 executes processing for actually stopping the self-sustaining operation. Specifically, the CPU 281 first stops the inverter 21 (S33), and further turns off the disconnection relay 24 (S34) so as to disconnect the inverter 21 reliably from the power system 5. The CPU 281 also turns off the relay contact 20a so as to disconnect the inverter 21 from the electric vehicle (EV) 1 (S35), opens the neutral point at the secondary side of the transformer 22 (S36), further stores, in the RAM 282, the state number or the flag indicating that the power control device 2 is not in the self-sustaining operation (S37), and terminates the processing of FIG. 3. A message that the self-sustaining operation has been stopped may be displayed at the operation/display unit 29 before terminating the processing of FIG. 3.

It is to be noted that the order of execution of the processing of the steps S33 to S36 is not limited to the order illustrated in FIG. 3, and may be suitably changed so that AC voltage to be supplied from the power control device 2 via the earth leakage breaker 40 to the panel board 4 drops earliest.

With Embodiment 1, in a case where an instruction to change the power control device 2 into the self-sustaining operation state is accepted, the inverter is connected with the power loads by the disconnection relay and the self-sustaining operation is started when voltage applied to the wiring portion between the disconnection relay and the earth leakage breaker is not detected, when current flowing between the main breaker and the power system is not detected and when a contact signal indicative of the open/close state of the main breaker indicates an open state, as described above. That is, opening of the main breaker by the user is detected as an essential condition and also it is detected that there is no input-output of voltage and current from or to the power system before a start of the self-sustaining operation, and therefore safety of the self-sustaining operation is further ensured.

Accordingly, the self-sustaining operation can be executed only when conditions for allowing the self-sustaining operation are satisfied reliably, so as to supply AC power to the power loads connected with the power system before the self-sustaining operation.

Moreover, the power control device 2 waits until the start button is pressed before starting the self-sustaining operation actually.

Accordingly, the actual self-sustaining operation can be started after waiting for clear declaration of intention by the user, which indicates the start of the self-sustaining operation.

Furthermore, a predetermined display is made at the display means when the voltage detector having a relay switch detects power restoration of the power system, the relay switch operating when the voltage of the power system becomes higher than a predetermined voltage.

Accordingly, a message that the power system has been restored from power failure during the self-sustaining operation can be displayed, for example, so as to prompt the user to take some measure.

Furthermore, the inverter is disconnected from the power system by the disconnection relay and the self-sustaining operation is stopped, when the power control device 2 is in the self-sustaining operation state in addition to that current flowing to or from the power system is detected or to that a contact signal indicative of the open/close state of the main breaker indicates a close state. That is, the inverter is disconnected reliably from the power system and the self-sustaining operation is stopped, when closing of the main breaker by the user is detected or when input-output of current from or to the power system is detected. Therefore safety of the self-sustaining operation can be ensured doubly.

(Embodiment 2)

Embodiment 1 is a form wherein one breaker (only main breaker 42) which can be opened and closed manually is provided between the power system 5 and the disconnection relay 24 excluding the earth leakage breakers 25 and 40. In contrast, Embodiment 2 is a form wherein two such breakers are provided.

Figure 4:
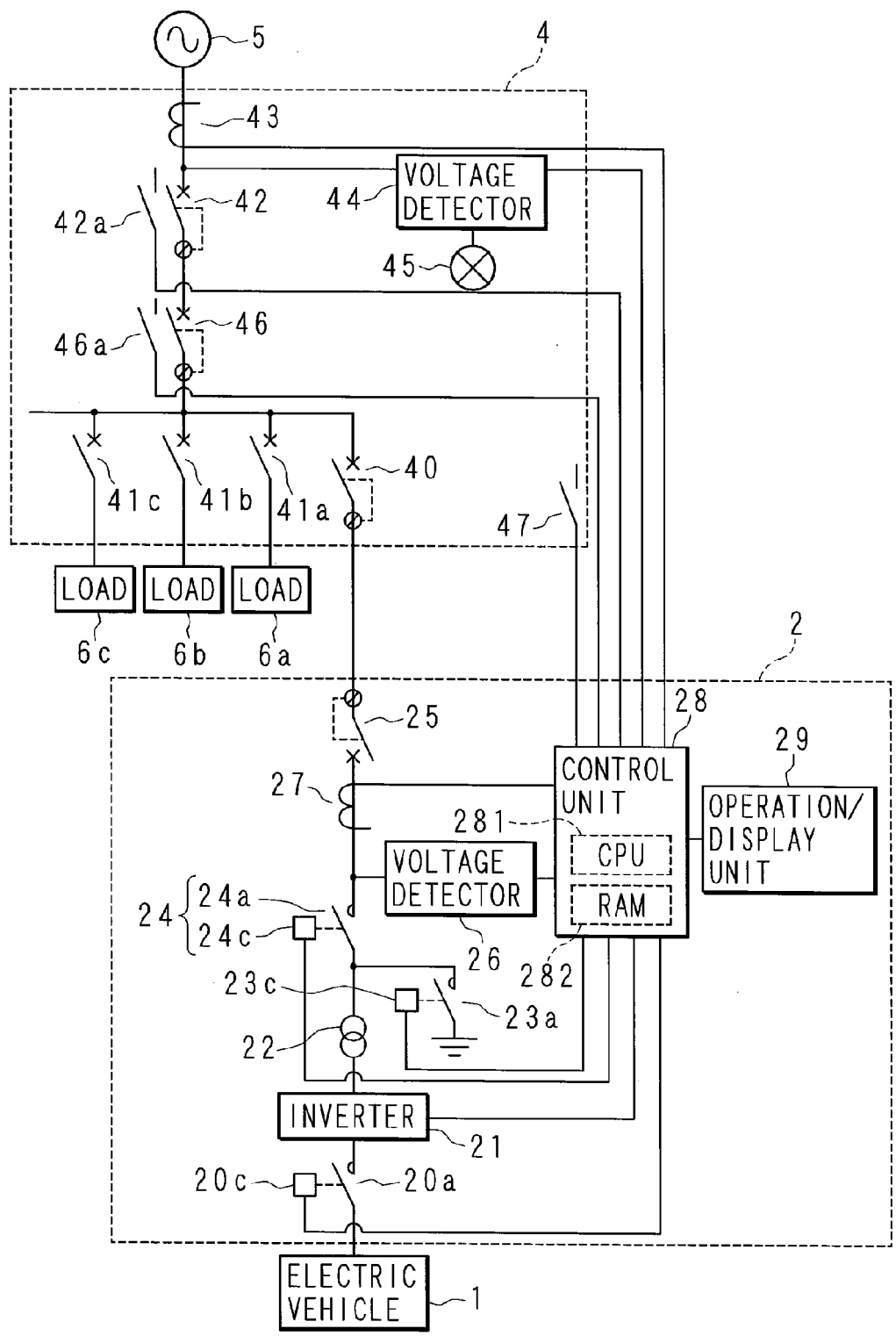
FIG. 4 is a block diagram for illustrating a connection example of a power control device according to Embodiment 2 of the present invention.

FIG. 4 is a block diagram for illustrating a connection example of a power control device 2 according to Embodiment 2 of the present invention.

In FIG. 4, a second main breaker (another breaker referred in the claims) 46 is connected in series with a main breaker 42 between the main breaker 42 and the earth leakage breaker 40. Both ends of a contact 46a which outputs a contact signal indicative of the open/close state of the second main breaker 46 are connected with a control unit 28. The control unit 28 is also connected with a contact 47 which outputs a contact signal indicative of the open/close state of an unillustrated cover of a panel board 4. The other configuration is the same as that of FIG. 1 in Embodiment 1.

The second main breaker 46 is to allow the user to disconnect the power control device 2 more reliably from the power system 5 in starting the self-sustaining operation. When the user causes the power control device 2 to start the self-sustaining operation, for example, it is required to open the second main breaker 46 in addition to the main breaker 42.

Accordingly, opening of the breaker by the user, before a start of the self-sustaining operation, is expected to be performed more reliably, and therefore safety of the self-sustaining operation can be enhanced.

Moreover, when the contact 46a is provided and both ends of the contact 46a are connected with the control unit 28 as in Embodiment 2, a CPU 281 can take in a contact signal outputted from the contact 46a and use the contact signal for determination in starting and stopping the self-sustaining operation. In the above-mentioned step S16 in FIG. 2, for example, determination of whether the main breaker 42 is open or not is replaced with determination of whether both of the main breaker 42 and the second main breaker 46 are open or not. Thus, when opening of two breakers are detected (S16: YES), the self-sustaining operation is started. Similarly, in the step S32 in FIG. 3, determination of whether the main breaker 42 is open or not is replaced with determination of whether both of the main breaker 42 and the second main breaker 46 are open or not. Thus, when it is detected that any one of the two breakers has been closed (S32: NO), the self-sustaining operation is stopped.

Accordingly, with Embodiment 2, safety of the self-sustaining operation can be further enhanced.

The contact 47 is used to preliminarily detect the possibility of occurrence of misoperation by the user. Specifically, in the above-mentioned step S32 in FIG. 3, when the main breaker 42 is open (S32: YES), the CPU 281 takes in a contact signal outputted from the contact 47, and detects opening of the cover on the basis of the open/close state indicated by the contact signal (a detection unit referred in the claims). When it is detected that the cover has been opened (or when it has not been detected that the cover has been opened), the CPU 281 proceeds to the step S33 (or S31). Thus, when it is detected that the cover has been opened artificially, the self-sustaining operation is stopped.

Accordingly, with Embodiment 2, safety of the self-sustaining operation can be ensured.

In addition, like reference signs are attached to elements corresponding to those of Embodiment 1, and description thereof will be omitted.

It is to be noted that the CPU 281 takes in contact signals outputted from the contacts 42a and 46a individually in the example described in Embodiment 2. However, the CPU 281 may take in one contact signal integrated by wired-OR connection of the contacts 42a and 46a. For example, the integrated contact signal indicates: an open state of both of the main breaker 42 and the second main breaker 46; and a close state of any one of the main breaker 42 and the second main breaker 46. In this case, the CPU 281 may take in the above-mentioned integrated contact signal instead of the contact signal given from the contact 42a and perform determination, in any one of the step S16 in FIG. 2 and the step S32 in FIG. 3.

(Embodiment 3)

Embodiment 1 is a form wherein the main breaker 42 is connected with the loads 6a, 6b and 6c via the branch breakers 41a, 41b and 41c. In contrast, Embodiment 3 is a form wherein a relay switch (electromagnetic contactor) 48 is interposed between a main breaker 42 and loads 6a, 6b and 6c.

Figure 5:
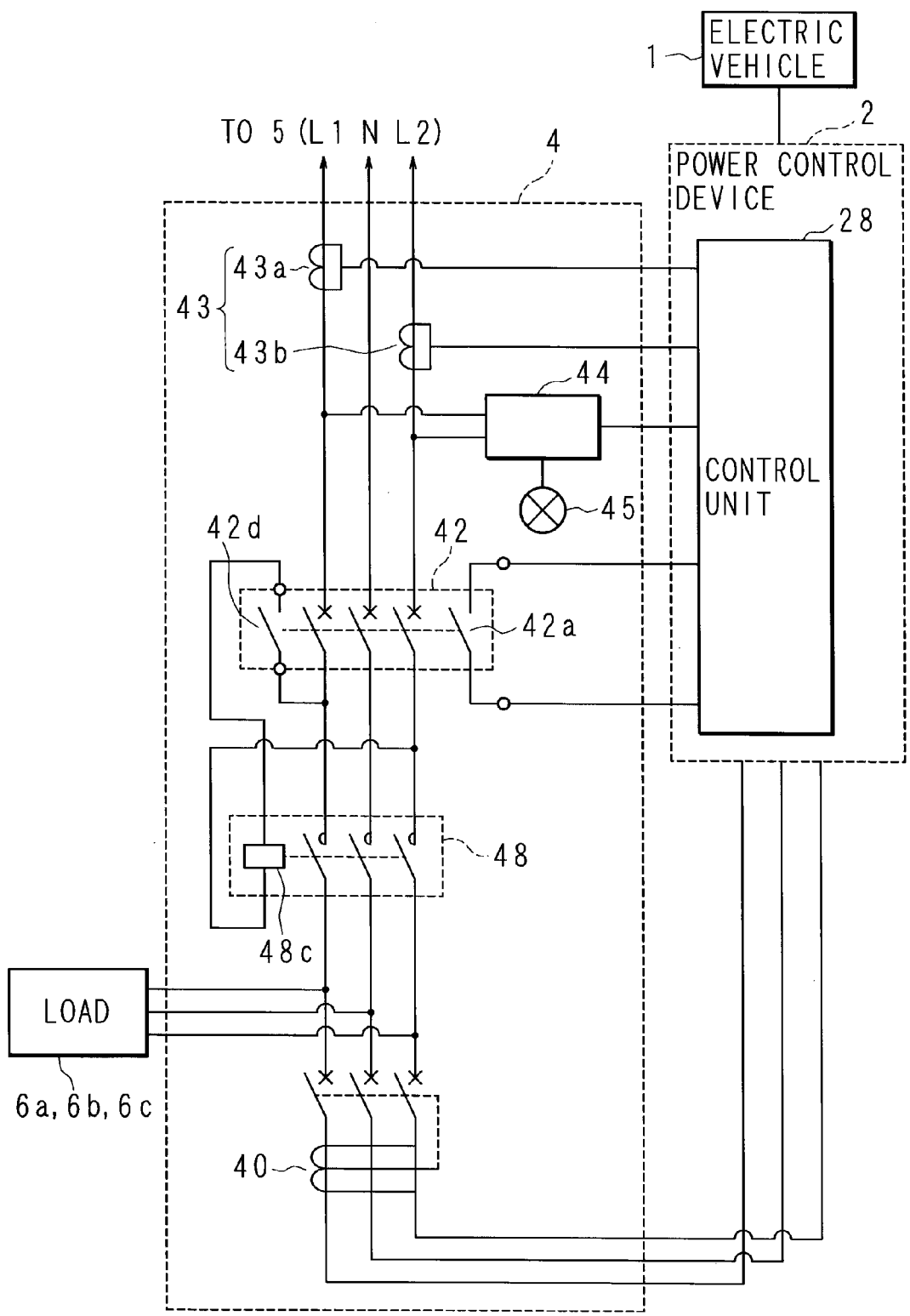
FIG. 5 is a block diagram for illustrating a connection example of a power control device according to Embodiment 3 of the present invention with outside.

FIG. 5 is a block diagram for illustrating a connection example of a power control device 2 according to Embodiment 3 of the present invention with outside. Each of the above-mentioned FIGS. 1 and 4 is drawn as a signal-line diagram. In contrast, FIG. 5 is drawn as a multi-line diagram. It is to be noted that illustration of the branch breakers 41a, 41b and 41c in FIGS. 1 and 4 is omitted in FIG. 5.

In FIG. 5, current transformers 43a and 43b respectively detect current flowing through lines L1 and L2 between the main breaker 42 and a power system 5, and give the detection results to a control unit 28. N is a neutral conductor. A voltage detector 44 detects voltage between the line L1 and the line L2, and gives the detection result to the control unit 28. The main breaker 42 includes a contact 42d, which is turned on when the main breaker 42 is in a close state, in addition to a contact 42a, which outputs a contact signal indicative of the open/close state of the main breaker 42.

A relay contact of the relay switch 48 is interposed between the main breaker 42 and the loads 6a, 6b and 6c, and between the main breaker 42 and the earth leakage breaker 40. The relay contact is turned on when a control coil 48c is excited. One end of the contact 42d is connected with the line L1 between the main breaker 42 and the relay switch 48, and the other end of the contact 42d is connected with one end of the control coil 48c. The other end of the control coil 48c is connected with the line L2 between the main breaker 42 and the relay switch 48.

In the configuration of FIG. 5, the main breaker 42 has been opened so as to be in an open state and the contact 42d is off, during the self-sustaining operation. Therefore control voltage to be applied from the line L1 of the power system 5 via the main breaker 42 and the contact 42d is not applied to one end of the control coil 48c. Moreover, control voltage to be applied from the line L2 of the power system 5 via the main breaker 42 is not applied to the other end of the control coil 48c. Thus, the relay switch 48 is turned off so that the main breaker 42 is disconnected from the loads 6a, 6b and 6c and from the earth leakage breaker 40.

Next, when the main breaker 42 is closed by mistake during the self-sustaining operation, the contact 42d is turned on so that control voltage is applied from the line L1 to one end of the control coil 48c and control voltage is applied from the line L2 of the power system 5 via the main breaker 42 to the other end of the control coil 48c. Therefore the relay switch 48 is turned on so that the main breaker 42 is connected with the loads 6a, 6b and 6c and with the earth leakage breaker 40. Here, time for turning on the contact 42d and time for exciting the control coil 48c of the relay switch 48 so as to turn on the relay contact are required between closing of the main breaker 42 and turn-on of the relay switch 48. Therefore spare time for stopping the inverter by the processing of the steps S32 and S33 in FIG. 3 is generated between closing of the main breaker 42 and turn-on of the relay switch 48.

In addition, like reference numerals are attached to elements corresponding to those of Embodiment 1, and description thereof will be omitted.

With Embodiment 3, control voltage for turning on the relay switch, which is interposed between the main breaker that disconnects the loads (power load) from the power system and the loads and between the main breaker and the earth leakage breaker, is applied from the power system via a contact, which is turned on when the main breaker is in a close state, and a contact of the main breaker itself, as described above.

Accordingly, the relay switch is turned off when power failure occurs in the power system after the main breaker is closed. In addition, the relay switch is never turned on after the main breaker is opened even when the power system is restored from power failure. Therefore the inverter is put into a state disconnected from the power system so that safety of the self-sustaining operation can be ensured.

Furthermore, when the breaker is closed after the self-sustaining operation is started in a state where the main breaker is open, closing of the breaker is detected and then the inverter is stopped before a lapse of delay time of a contact, which is turned on when the main breaker is put into a close state, and of delay time until the relay contact is turned on by the control coil of the relay switch. This can prevent misconnection of the inverter with the power system.

It is to be noted that the case where the main breaker 42 and the relay switch 48 are connected in series is described in Embodiment 3. However, the second main breaker 46 may be connected in series with the main breaker 42 as illustrated in Embodiment 2 and the relay switch 48 may be further connected with them in series. In such a case, a contact (contact other than the contact 46a of Embodiment 2), which is turned on when the second main breaker 46 is in a close state is prepared and this contact is connected in series with the above-mentioned contact 42d. In this configuration, the relay switch 48 is turned on only when both of the main breaker 42 and the second main breaker 46 are closed. Therefore safety of the self-sustaining operation is enhanced.

Embodiments disclosed herein should be considered illustrative in all respects and not restrictive. The scope of the present invention is defined not by the above-mentioned senses but by the claims and is intended to include all changes within the scope and senses equivalent to the claims.

The invention claimed is:

1. A power control device, comprising:
an inverter that converts DC power into AC power;
a control unit that performs control so that AC power converted by the inverter is supplied, in linkage with a power system, to a power load which is to be supplied with electric power from the power system via a breaker and a current detector;
a disconnection relay for disconnecting the inverter from the power system;
a take-in unit that takes in a contact signal indicative of an open/close state of the breaker; and
a voltage detector that detects voltage at the power system side of a circuit to be disconnected by the disconnection relay,
wherein the control unit includes:
  a storage unit in which whether the power control device is in a predetermined operating state or not is stored;
  a first determination unit that determines whether the voltage detector has detected voltage or not;
  a second determination unit that determines whether the current detector has detected current or not; and
  an acceptance unit that accepts an instruction to put the power control device into the predetermined operating state when an information that the power control device is not in the predetermined operating state is stored in the storage unit,
wherein the control unit causes the disconnection relay to connect the inverter with the power load and stores, in the storage unit, an information that the power control device is in the predetermined operating state, in a case where the acceptance unit accepts the instruction, where the first determination unit and the second determination unit determine that voltage and current have not been detected and where a contact signal taken in by the take-in unit indicates an open state.

2. The power control device according to claim 1,
wherein the control unit includes a signal acceptance unit that accepts a predetermined signal in the case where the acceptance unit accepts the instruction, where the first determination unit and the second determination unit determine that voltage and current have not been detected and where a contact signal taken in by the take-in unit indicates an open state,
wherein the control unit connects the inverter with the power load when the signal acceptance unit accepts the predetermined signal.

3. The power control device according to claim 1,
wherein the control unit causes the disconnection relay to disconnect the inverter from the power system and stores, in the storage unit, an information that the power control device is not in the predetermined operating state, when an information that the power control device is in the predetermined operating state is stored in the storage unit in addition to that the second determination unit determines that current has been detected or to that a contact signal taken in by the take-in unit indicates a close state.

4. The power control device according to claim 1,
wherein the breaker is connected in series with another breaker.

5. The power control device according to claim 1,
wherein a relay switch is interposed between the breaker and the power load,
wherein the relay switch is turned on by control voltage applied from the power system via the breaker and a contact, which is turned on when the breaker is in a close state.

6. The power control device according to claim 1,
wherein the power system is connected with a second voltage detector,
wherein the control unit includes a display unit that makes a predetermined display when the second voltage detector detects a predetermined voltage.

7. The power control device according to claim 1,
wherein the breaker is provided in a panel board having a cover,
wherein the control unit includes a detection unit that detects that the cover has been opened,
wherein the control unit causes the disconnection relay to disconnect the inverter from the power system and stores, in the storage unit, an information that the power control device is not in the predetermined operating state, in a case where an information that the power control device is in the predetermined operating state is stored in the storage unit and where the detection unit detects that the cover has been opened.

* * * * *